(12) United States Patent
Yokota et al.

(10) Patent No.: US 6,466,397 B1
(45) Date of Patent: Oct. 15, 2002

(54) TAPE CASSETTE LOADING DEVICE, AND A TAPE DECK HAVING THE SAME

(75) Inventors: Katsuyuki Yokota, Anan; Hiroshi Hamahata, Yamatokoriyama, both of (JP)

(73) Assignee: Funai Electric Co., Ltd., Daito (JP)

( * ) Notice: Subject to any disclaimer, the term of this patent is extended or adjusted under 35 U.S.C. 154(b) by 53 days.

(21) Appl. No.: 09/629,837

(22) Filed: Jul. 31, 2000

(30) Foreign Application Priority Data

Aug. 5, 1999 (JP) .......................................... 11-005895

(51) Int. Cl.⁷ ............................................ G11B 15/675
(52) U.S. Cl. ...................................................... 360/96.5
(58) Field of Search ................................ 360/965, 96.1, 360/96.6, 93

(56) References Cited

U.S. PATENT DOCUMENTS

| 5,706,146 A | * | 1/1998 | Ono ............................ 360/94 |
| 5,706,147 A | * | 1/1998 | Lee ............................ 360/96.5 |
| 5,825,584 A | * | 10/1998 | Son ............................ 360/96.5 |

FOREIGN PATENT DOCUMENTS

| JP | 59-180847 | * 10/1984 | ..................... 15/66 |
| JP | 63-197053 A | 8/1988 | |
| JP | 2-236855 | 9/1990 | |
| JP | 5-36689 | 5/1993 | |

* cited by examiner

Primary Examiner—Hoa T. Nguyen
Assistant Examiner—Jennifer M Dolan
(74) Attorney, Agent, or Firm—William F. Pinsak

(57) ABSTRACT

A cassette plate is provided with a bendable bottom plate, right and left side walls, and upper plates extending toward an inward direction from said side walls. The bottom plate includes a platform having a function for pushing up a backside of a tape cassette when the tape cassette is inserted into the cassette plate through a front mouth. Owing to this construction, the bottom plate convexly bends downward, and the tape cassette is kept at a distance from the bottom plate of the cassette plate. In this state, the tape cassette is supported by the platform and upper plates of the cassette plate. Therefore, this assimilates variations of the components in size, and eliminates a need of a conventional pushing spring. The constitution can decrease the number of the component in a simple construction, thereby reducing the cost in a tape cassette loading device, and a tape deck having the same.

8 Claims, 3 Drawing Sheets

TAPE CASSETTE LOADING DEVICE, AND A TAPE DECK HAVING THE SAME

BACKGROUND OF THE INVENTION

This invention relates generally to a loading device for a tape cassette containing a magnetic tape, which is employed in a tape deck and the like, and also relates to a tape deck having the same.

Conventionally, in a tape deck and the like, a tape cassette containing a magnetic tape which is loaded in a magnetic recording and/or playing apparatus, has been guided into a predetermined position for a recording and/or playing operation (this is named as cassette loading operation). Then, the magnetic tape is drawn out from the tape cassette, and wound around a rotational drum (this is named as tape loading operation). The cassette loading operation is carried out by moving the cassette plate backward and downward in a state that the cassette plate (or bracket) supported movably to a frame member in a body of the apparatus, receives the tape cassette. Further, there has been known an apparatus that a member for receiving the tape cassette is provided with a resin plate, and the resin plate is provided with a projection which contacts with the tape cassette in order to stably load the tape cassette (e.g., refer to Japanese Laid-Open Utility Model Publication No. 5-36689).

However, in the above-mentioned conventional tape cassette loading device, the cassette plate for receiving the tape cassette includes a metal spring (cassette pushing spring) on right and left upper plates thereof for pushing down the tape cassette toward a bottom plate of the cassette plate, so that the tape cassette is set in a predetermined position for a recording and/or playing operation after the cassette loading operation is completed. When the cassette plate is in a downward position after the cassette loading operation is completed, rotational axes on tape reel mounts of the device body is engaged in tape reel holes. At the time, the pushing spring is pressed (varieties of the components in size are assimilated by the pressing amount), so that the tape cassette is kept at distance from the bottom plate of the cassette plate.

However, due to the structure that the cassette plate is provided with a metal spring for pushing down the tape cassette, the number of components is increased, and the cost becomes high. Further, there is a problem that the metal spring is apt to be detached and broken.

SUMMARY OF THE INVENTION

This invention is made to solve the above-mentioned problems. One object of the present invention is to provide a tape cassette loading device and a tape deck having the same, wherein a simple structure of the device allows the number of components to be decreased, thereby reducing the cost, and having a resistance to damage.

In order to achieve the above-mentioned object, according to one aspect of the present invention, in a tape cassette loading device which executes a cassette loading operation for guiding a tape cassette into a predetermined position in a magnetic recording and/or playing apparatus by a movement of a cassette plate which receives the tape cassette containing a magnetic tape: wherein said cassette plate comprising a bendable bottom plate, right and left side walls and upper plates extending inward from top ends of said side walls, is constituted so as to receive the tape cassette through a front mouth, and supported so as to be movable toward a frame member of the apparatus; and, wherein said cassette plate includes a platform on a center of the bottom plate, which has a function for pushing up an underside of the tape cassette when the tape cassette is inserted in said cassette plate.

In the above-described constitution, the tape cassette which is inserted in the cassette plate through the front mouth, is supported by the bendable plate, right and left side walls, and upper plates of the cassette plate, and then, moved in the frame member, by which the tape cassette is loaded in a predetermined position (cassette loading operation). The bottom plate of the cassette plate has a platform on a center thereof, which pushes up the tape cassette from its underside. As a reaction to it, the bendable bottom plate convexly bends downward. Consequently, the tape cassette is kept at a distance from the bottom plate of the cassette plate, and besides, supported between the upper plates, platform and side walls. In this state, the tape cassette is stably loaded. Thus, the cassette plate supports the tape cassette with taking advantage of the bendability of the bottom plate thereof, so that the variations of the components in size can be assimilated. This construction makes it possible to eliminate a need of a conventional pushing spring, and becomes resistant to damage. Besides, the simple construction can decrease the number of components, and reduce the cost.

According to another aspect of the present invention, in the tape cassette loading device, when the tape cassette is inserted in the cassette plate, said platform pushes up the underside of the tape cassette, by which the bottom side of the cassette plate convexly bends downward so that the tape cassette is supported by the platform, and right and left upper walls.

According to a further aspect of the present invention, in the tape cassette loading device, a front edge of the cassette plate is formed in a tapered shape.

According to a further aspect of the present invention, in the tape cassette loading device, said cassette plate comprises either one of a bendable metal plate, and a combination of a metal plate and a resin-molded product.

DETAILED DESCRIPTION OF THE PREFERRED EMBODIMENT OF THE PRESENT INVENTION

Figure 1:
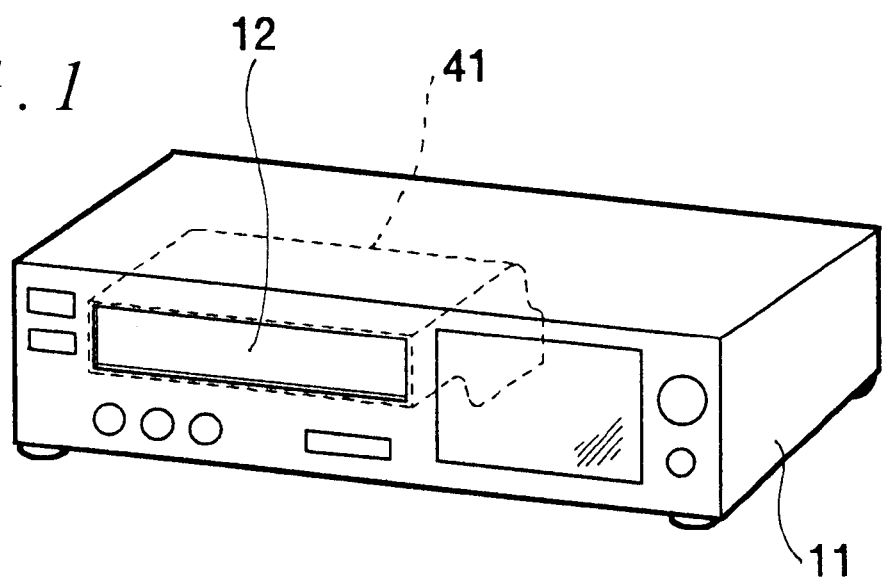
FIG. 1 is an external view of a tape deck according to one embodiment of the present invention.
Figure 2:
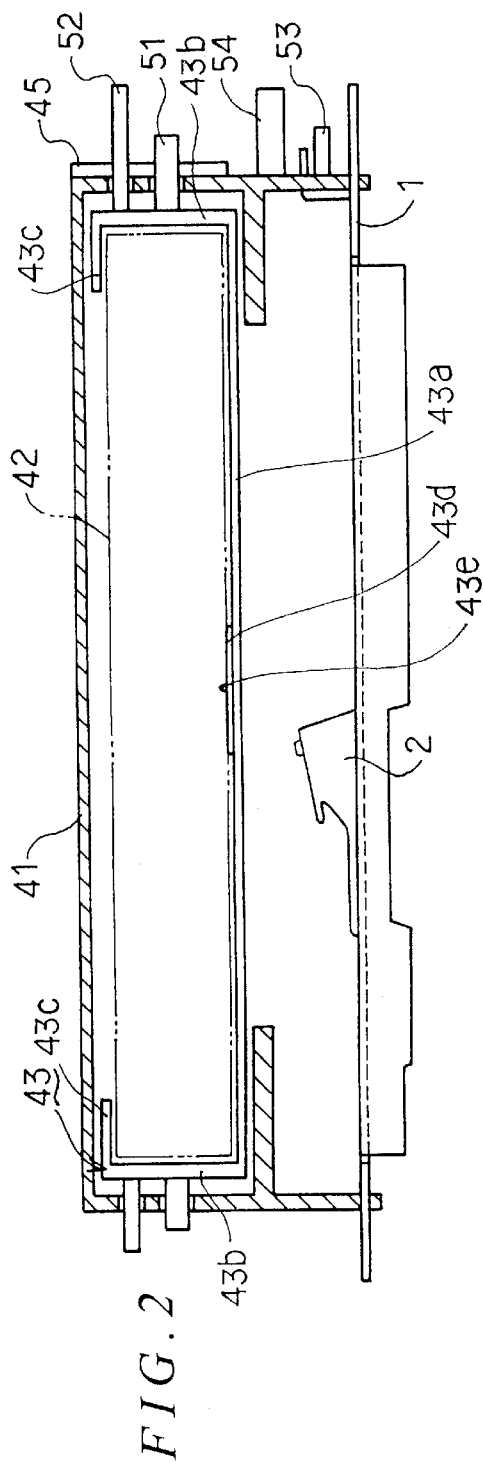
FIG. 2 is a front view showing a mouth for inserting a tape cassette in said tape deck.
Figure 3:
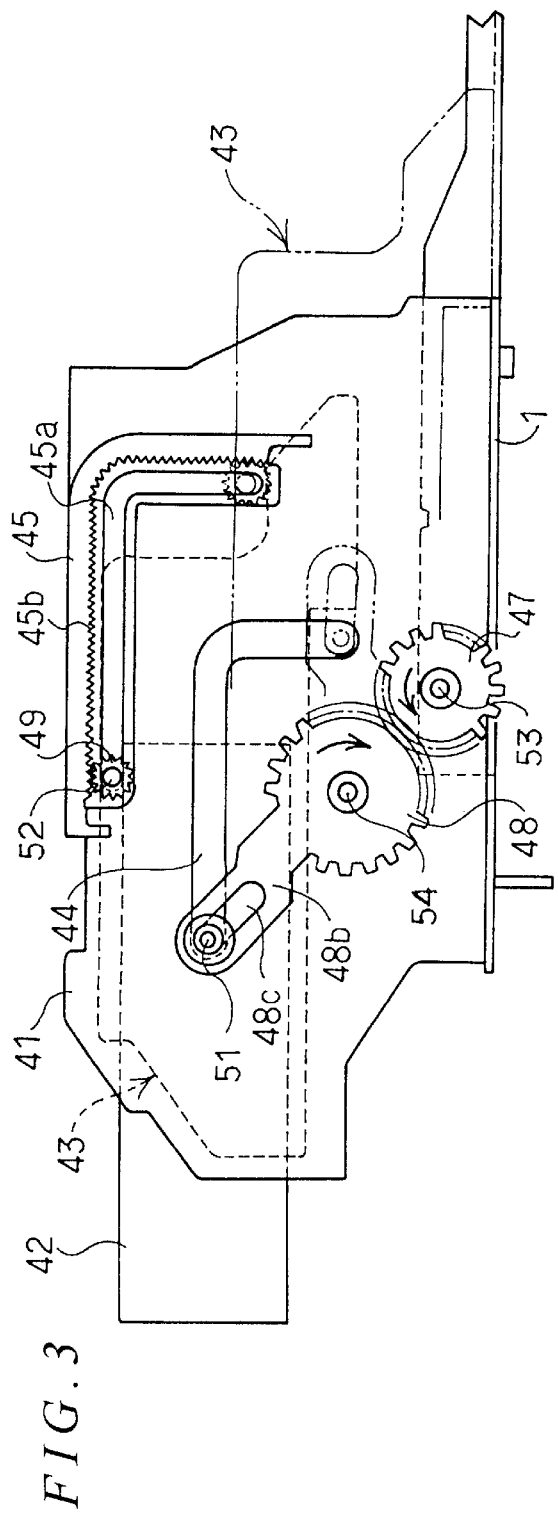
FIG. 3 is a side view showing a mechanism for loading a tape cassette in said tape deck.
Figure 4:
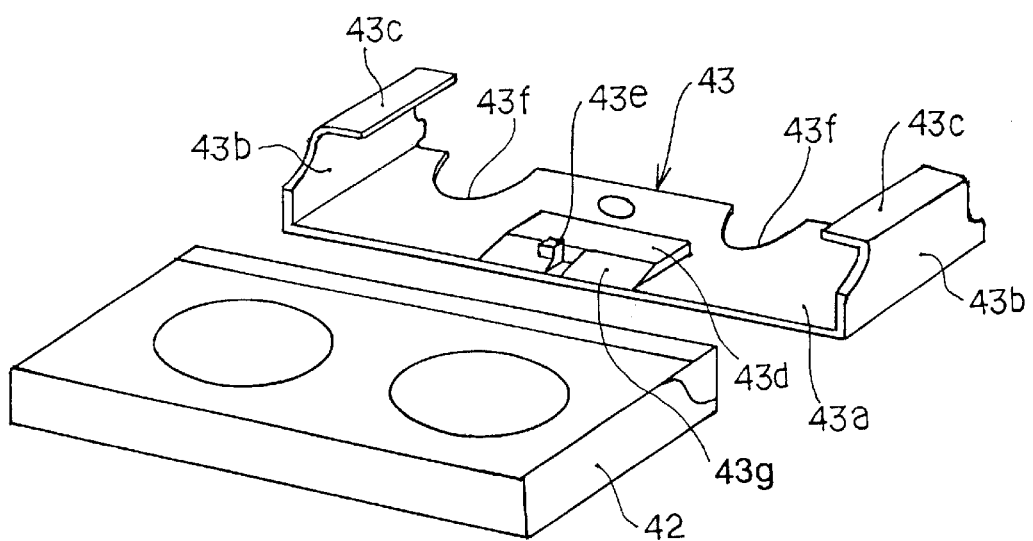
FIG. 4 is a perspective view of a cassette plate for receiving a tape cassette.
Figure 5:
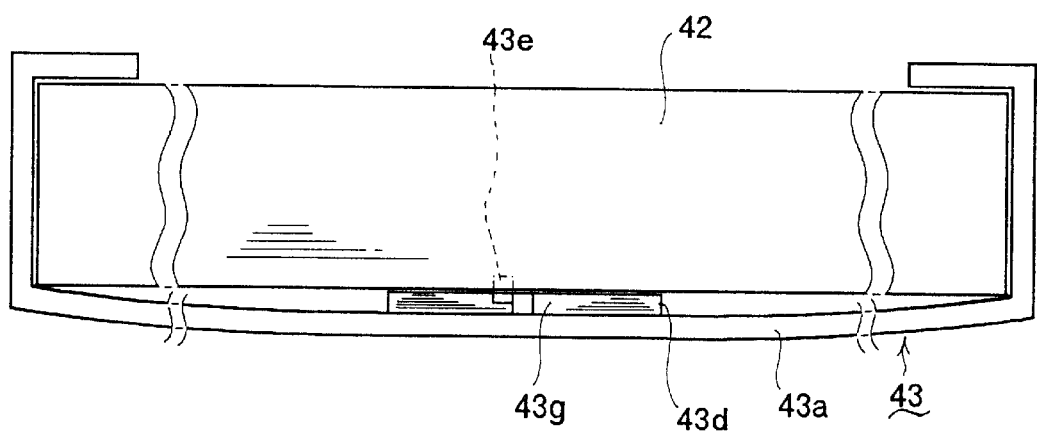
FIG. 5 is a magnified view showing a contacting state between the tape cassette and a platform.

Now, one embodiment of the present invention will be explained with reference to the drawings. FIG. 1 shows an external view of a tape deck in the present invention, and FIG. 2 shows an insertion mouth for inserting a tape cassette in the tape deck. FIG. 3 shows a mechanism for loading the tape cassette. FIG. 4 is a perspective view of a cassette plate for receiving the tape cassette, and FIG. 5 is a magnified view for explaining an effect of the present invention. As shown in FIGS. 1 through 3, the tape deck composing a magnet recording and/or playing apparatus, has a mouth 12 for receiving a tape cassette, on a front side of a housing 11, wherein there is provided a chassis 1 on which a frame member 41 having a rectangle section is mounted. The frame member 41 supports the cassette plate 43 that receives the tape cassette, and guides and loads it into a predetermined position for recording and playing (this operation is named as cassette loading operation). In this state, the cassette plate 43 can be slid and stored just like a drawer, and moved down. Further, the chassis 1 is provided with a slope piece 2 for mounting a rotational drum (head cylinder), and other members (not shown in the figures) such as a tape loading mechanism for winding a tape around the rotational drum, a tape supply reel base and a tape take-up reel base. The tape loading operation is executed after completing a cassette loading operation.

Next, a supporting structure (a mechanism for carrying out a cassette loading operation) that supports the above cassette plate 43 in the frame member 41 is explained. The cassette plate 43 is provided with axes 51 and 52 on sides thereof. The axes 51 and 52 are inserted respectively through an L-shaped guiding groove 44 formed on a side of the frame member 41, and a groove 45a of a guiding member 45. The axis 51 is linked on an end thereof with a long hole 48c of an arm 48b provided on a driven gear 48 which is driven to rotate by a driving gear 47. The axis 52 supports on an end thereof a gear wheel 49 which engages a row of teeth 45b of the guiding member 45. The driving gear 47 and driven gear 48 are supported by axes 53 and 54 that are provided on the frame member 41. The driving gear 47 receives driving force transmitted from a cam motor (not shown in the figures) as a driving source for a cassette loading operation. The driving gear 47 and driven gear 48 are not shown in FIG. 2.

An action of the above cassette loading mechanism is nextly explained. When a tape cassette 42 is inserted in the cassette plate 43, which is detected by a switch and the like, the cam motor (not shown) is driven for rotationally driving a driven gear 48 through a driving gear 47 in a direction shown by an arrow. The rotational driving of the driven gear 48 acts on the axis 51 so as to have the cassette plate 43 move forward (right in FIG. 3) along with the L-shaped guiding groove 44 from a dashed-line position, then move down into a phantom-line position. In this position, the tape cassette 42 is loaded in a predetermined position, and this completes the cassette loading operation.

The explanation is nextly given to a detail structure of the cassette plate 43 for receiving the tape cassette 42, referring to FIGS. 2 and 4. The cassette plate 43 is made by a bendable metal plate or a combination of a metal plate and a resin-molded product, and provided with a bottom plate 43a (e.g., made by an iron plate), right and left side walls 43b (resin), and upper plates 43c which extend toward an inward direction from top ends of said side walls 43b. The cassette plate 43 is formed so as to receive the tape cassette 42 through a front mouth. The bottom plate 43a of the cassette plate 43 has a platform 43d for pushing up an underside of the tape cassette 42 which is inserted in the cassette plate 43, and has a projection 43e in order to prevent the tape cassette 42 from being inserted reversely. The platform 43d is formed in a central front of the bottom plate 43a, and has a front edge that is formed in a tapered shape 43g (FIG. 5). The cassette plate 43 includes half-round notches 43f, which are formed on a back edge thereof in order to place reels of the tape cassette 42 on the tape reel mounts of a body of the apparatus.

In the above-structured cassette plate 43, inserting the tape cassette 42 through the front mouth of the cassette plate 43 moves the cassette plate 43 in the frame member 41 of the device body, by which the tape cassette 42 is loaded in the predetermined position for the recording/playing operation. The tape cassette 42 which is inserted in the cassette plate 43, is supported by the bendable bottom plate 43a, right and left side walls 43b and upper plates 43c of the cassette plate 43, and pushed up from the underside thereof by the platform 43d formed on the bottom plate 43a. As a reaction to it, the bendable bottom plate 43a convexly bends downward as shown in FIG. 5. Therefore, the tape cassette 42 is kept at a distance from the bottom plate 43a of the cassette plate 43, and supported between the bottom plate 43a, platform 43d and right and left upper plates 43c. Thus, variations of the components in size can be assimilated by a bending effect of the bottom plate 43a. This makes it possible to eliminate a conventional pushing spring (which might be provided on the underside of the upper plate 43c in FIG. 3), which resolves a problem caused by the pushing spring being susceptible to damage.

Moreover, the upward tapered shape 43g of the front edge of the bottom plate 43a in the cassette plate 43 makes it easier to insert the tape cassette 42 through the front mouth of the cassette plate 43, and makes it possible to stably load the tape cassette 42 in the cassette plate 43.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims. For example, not limited to the above-described structure of the cassette loading mechanism and shape of the cassette plate 43, various shapes can be applied.

What is claimed is:

1. An improved tape cassette loading device which executes a cassette loading operation for guiding a tape cassette to a predetermined position in a magnetic recording and/or playing apparatus by a movement of a cassette plate which receives the tape cassette containing a magnetic tape, wherein the improvement comprises:

said cassette plate having a bendable bottom plate, right and left side walls and upper flanges extending inwardly from the top ends of said side walls;

said cassette plate being constituted so as to receive the tape cassette through a front mouth, and supported so as to be movable toward a frame member of the said apparatus, and wherein said cassette plate includes a platform on a center of the bottom plate, which has a function for pushing up an underside of the tape cassette when the tape cassette is inserted in said cassette plate, whereby the bendable bottom plate convexly bends downward so that the tape cassette is supported by the platform and the upper flanges of the right and left upper walls.

2. A tape deck having the tape cassette loading device according to claim 1.

3. The tape cassette loading device according to claim 1, wherein a front edge of the cassette plate is formed in a tapered shape.

4. A tape deck having the tape cassette loading device according to claim 3.

5. The tape cassette loading device according to claim 1, wherein said cassette plate is comprised of a bendable metal material.

6. A tape deck having the tape cassette loading device according to claim 5.

7. The tape cassette loading device according to claim 1, wherein said cassette plate is comprised of a combination of a bendable metal plate and a resin-molded material.

8. A tape deck having the tape cassette loading device according to claim 7.

* * * * *